US007024561B2

(12) United States Patent
Inoha et al.

(10) Patent No.: US 7,024,561 B2
(45) Date of Patent: Apr. 4, 2006

(54) CONTENTS RECORDING APPARATUS, RECORDING MEDIUM, CONTENTS REPRODUCING APPARATUS, CONTENTS TRANSMISSION METHOD, TRANSMISSION MEDIUM, AND CONTENTS RECEPTION METHOD

(75) Inventors: Wataru Inoha, Kanagawa-ken (JP); Takayuki Sugahara, Kanagawa-ken (JP); Kenjiro Ueda, Kanagawa-ken (JP); Toshio Kuroiwa, Kanagawa-ken (JP); Seiji Higurashi, Tokyo (JP)

(73) Assignee: Victor Company of Japan, Limited., Kanagawa-Ken (JP)

(*) Notice: Subject to any disclaimer, the term of this patent is extended or adjusted under 35 U.S.C. 154(b) by 850 days.

(21) Appl. No.: 10/023,838

(22) Filed: Dec. 21, 2001

(65) Prior Publication Data

US 2002/0085714 A1  Jul. 4, 2002

(30) Foreign Application Priority Data

Dec. 28, 2000  (JP)  ............................ P2000-400669
Dec. 28, 2000  (JP)  ............................ P2000-400670

(51) Int. Cl.
G06F 11/30  (2006.01)

(52) U.S. Cl. ...................... 713/182; 713/200; 713/201; 380/44; 380/277; 380/283

(58) Field of Classification Search ............... 713/182, 713/200, 201; 380/44, 277, 283
See application file for complete search history.

(56) References Cited

U.S. PATENT DOCUMENTS 5,774,058 A * 6/1998 Henry et al. ............... 340/5.5
5,924,094 A * 7/1999 Sutter ......................... 707/10
6,088,717 A * 7/2000 Reed et al. ................. 709/201

FOREIGN PATENT DOCUMENTS

| JP | 09-139930 | 5/1997 |
| JP | 10-341212 | 12/1998 |
| JP | 2000-149417 | 5/2000 |
| WO | WO 95/17059 | 6/1995 |
| WO | WO 98/27732 | 6/1998 |
| WO | WO 00/62476 | 10/2000 |

* cited by examiner

*Primary Examiner*—Thomas R. Pesso
(74) *Attorney, Agent, or Firm*—Nath & Associates PLLC; Gary M. Nath; Gregory B. Kang

(57) ABSTRACT

A recording apparatus generates key information based at least on contents reproduction permission information, encrypts contents based on the key information, and records the encrypted contents and recording date/time information on a recording medium. A reproducing apparatus reads the encrypted contents and the recording date/time information from the recording medium, acquires reproduction date/time information on the encrypted contents and, based on the recording date/time information that was read, the reproduction date/time information, and reproduction permission limit information on the encrypted contents, generates contents reproduction permission information indicating that the encrypted contents maybe reproduced. The reproducing apparatus generates key information based at least on the contents reproduction permission information and decrypts the encrypted contents that were read.

14 Claims, 5 Drawing Sheets

CONTENTS RECORDING APPARATUS, RECORDING MEDIUM, CONTENTS REPRODUCING APPARATUS, CONTENTS TRANSMISSION METHOD, TRANSMISSION MEDIUM, AND CONTENTS RECEPTION METHOD

BACKGROUND OF THE INVENTION

1. Field of the Invention

The present invention relates to a contents recording apparatus, recording medium, contents reproducing apparatus, contents transmission method, transmission medium, and contents reception method that allow the user to decrypt encrypted recorded contents for a predetermined period of time.

2. Description of the Related Art

On a recording/reproducing apparatus capable of recording and reproducing contents supplied via broadcasting or a package medium, a variety of limitations are imposed on playing back contents in order to protect the copyright of contents. In digital satellite broadcasting, programs are already broadcast in the pay-per-day system. In this system, a general user who is an audience executes a predetermined purchase operation to pay the program provider for what the user will play back. Then, the user may play back the program on that day as many times as the user wants.

For contents recorded on a recording medium, Japanese Patent Laid-Open Publication No. 2000-149417 discloses a method in which, when the user reproduces contents, a flag is set to indicate that the contents are already reproduced to prevent the user from playing them back more than once.

However, when the user uses a contents recording apparatus to record a broadcast program onto a recording medium in the conventional pay-per-day method, the user is able to play back the program as many times as the user wants.

On the other hand, when copy control information is used to prevent a broadcast program from being recorded, the user is not able to watch a desired scene on the recording/reproducing apparatus as may times as the user wants although the user has paid for the program.

In addition, when contents are supplied only as a broadcasting program in real time in the pay-per-day method, the number of times the program may be played back differs between a user who purchases the program in the morning and a user who purchases the program in the night although they pay for the program the same amount of money.

SUMMARY OF THE INVENTION

In view of the foregoing, it is an object of the present invention to provide a contents recording apparatus, recording medium, contents reproducing apparatus, contents transmission method, transmission medium, and contents reception method that allow the user to decrypt encrypted contents only for a predetermined period of time.

To achieve the above object, there is provided a contents recording apparatus comprising: date/time information acquiring means for acquiring information on a date and time; contents reproduction permission information generating means for generating contents reproduction permission information indicating that contents may be reproduced; key information generating means for generating key information based at least on the generated contents reproduction permission information; encrypting means for encrypting the contents based on the generated key information; and recording means for recording the encrypted contents and recording date/time information or preset recording date/time information in a recoding medium, the recording date/time information being acquired by the date/time information acquiring means and being information on a date/time that is between a moment the contents are entered and a moment the contents are recorded.

To achieve the above object, there is provided a recording medium recording therein: contents encrypted based on key information generated based at least on contents reproduction permission information indicating that the contents may be reproduced; and either recording date/time information on a date/time at which recording operation on the encrypted contents was performed or preset recording date/time information.

To achieve the above object, there is provided a contents reproducing apparatus that reproduces contents from a recording medium storing therein contents encrypted based on key information, generated based at least on contents reproduction permission information indicating that the contents may be reproduced, and either recording date/time information on a date/time at which recording operation on the encrypted contents was performed or preset recording date/time information, the contents reproducing apparatus comprising: date/time information acquiring means for acquiring information on a date and time; contents reading means for reading the encrypted contents from the recording medium; recording date/time information reading means for reading the recording date/time information from the recording medium; contents reproduction permission information generating means for generating contents reproduction permission information indicating that the encrypted contents maybe reproduced based on the recording date/time information that was read, reproduction date/time information that is acquired by the date/time information acquiring means and that is information on a date/time that is between a moment a reproduction request for the encrypted contents is made and a moment key information for decrypting the encrypted contents is generated, and reproduction permission limit information on the encrypted contents; key information generating means for generating the key information based at least on the generated contents reproduction permission information; and decrypting means for decrypting the encrypted contents read from the recording medium based on the key information generated by the key information generating means.

In a preferred embodiment of the present invention, the reproduction permission limit information is set in the apparatus in advance.

In a preferred embodiment of the present invention, the reproduction permission limit information is set in the apparatus based on eternally supplied information.

To achieve the above object, there is provided a contents recording apparatus comprising: date/time information acquiring means for acquiring information on a date/time; key information generating means for generating key-information generating information and for generating key information from the key-information generating information; encrypting means for encrypting contents based on the generated key information; recording means for recording, in a recording medium, the encrypted contents and recording date/time information that is acquired by the date/time information acquiring means and that is information on a date/time that is between a moment the contents are entered and a moment the contents are recorded; and retaining means for retaining the recording date/time information acquired by the date/time information acquiring means and the key-information generating information generated by the key information generating means, the recording date/time information being associated with the key-information generating information.

In a preferred embodiment of the present invention, the contents recording apparatus further comprises: comparing means for comparing the recording date/time information retained in the retaining means and current date/time information that is information on a current date/time acquired by the date/time information acquiring means; and controlling means for erasing or changing the recording date/time information retained in the retaining means and the key-information generating information associated with the recording date/time information according to a comparison result of the comparing means.

To achieve the above object, there is provided a contents reproducing apparatus that reproduces encrypted contents from a recording medium storing therein the contents encrypted based on key information and recording date/time information on a date/time at which recording operation on the encrypted contents was performed, the reproducing apparatus comprising: contents reading means for reading the encrypted contents from the recording medium; recording date/time information reading means for reading the recording date/time information from the recording medium; retaining means for retaining the recording date/time information and key-information generating information, the recording date/time information being associated with the key-information generating information; retained information reading means for reading the key-information generating information, which is associated with the recording date/time information that was read, from the retaining means; key information generating means for generating the key information based on the key-information generating information that was read; and decrypting means for decrypting the encrypted contents, read from the recording means, based on the key information generated by the key information generating means.

In a preferred embodiment of the present invention, the contents reproducing apparatus further comprises: date/time information acquiring means for acquiring information on a date/time; comparing means for comparing the recording date/time information retained in the retaining means and current date/time information that is information on a current date/time acquired by the date/time information acquiring means; and a controller that stops an information reading operation of the retained information reading means or stops a decryption operation of the decrypting means according to a comparison result of the comparing means.

To achieve the above object, there is provided a contents transmission method comprising the steps of: generating contents reproduction permission information indicating that contents may be reproduced; generating key information based at least on the generated contents reproduction permission information; encrypting the contents based on the generated key information; and transmitting the encrypted contents and either transmission date/time information on information on a date/time at which a transmission operation of the encrypted contents was performed or preset transmission date/time information.

To achieve the above object, there is provided a transmission medium that transmits: contents encrypted based on key information generated based at least on contents reproduction permission information indicating that the contents may be reproduced; and either transmission date/time information on a date/time at which a transmission operation of the encrypted contents was performed or preset transmission date/time information.

To achieve the above object, there is provided a contents reception method that receives contents encrypted based on key information, generated based at least on contents reproduction permission information indicating that the contents may be reproduced, and either transmission date/time information on a date/time at which transmission operation on the encrypted contents was performed or preset transmission date/time information, the method comprising the steps of: storing the received encrypted contents and the transmission date/time information; acquiring reproduction date/time information on a date/time that is between a moment a reproduction request for the stored encrypted contents is made and a moment key information for decrypting the encrypted contents is generated; generating contents reproduction permission information indicating that the encrypted contents may be reproduced based on the stored transmission date/time information, the reproduction date/time information, and contents reproduction permission limit information on the encrypted contents; generating the key information based at least on the generated contents reproduction permission information; and decrypting the stored encrypted contents based on the generated key information.

In a preferred embodiment of the present invention, the reproduction permission limit information is set in advance.

In a preferred embodiment of the present invention, the reproduction permission limit information is set based on eternally supplied information.

The nature, principle and utility of the invention will become more apparent from the following detailed description when read in conjunction with the accompanying drawings.

DESCRIPTION OF THE PREFERRED EMBODIMENTS

<First Embodiment>

Figure 1:
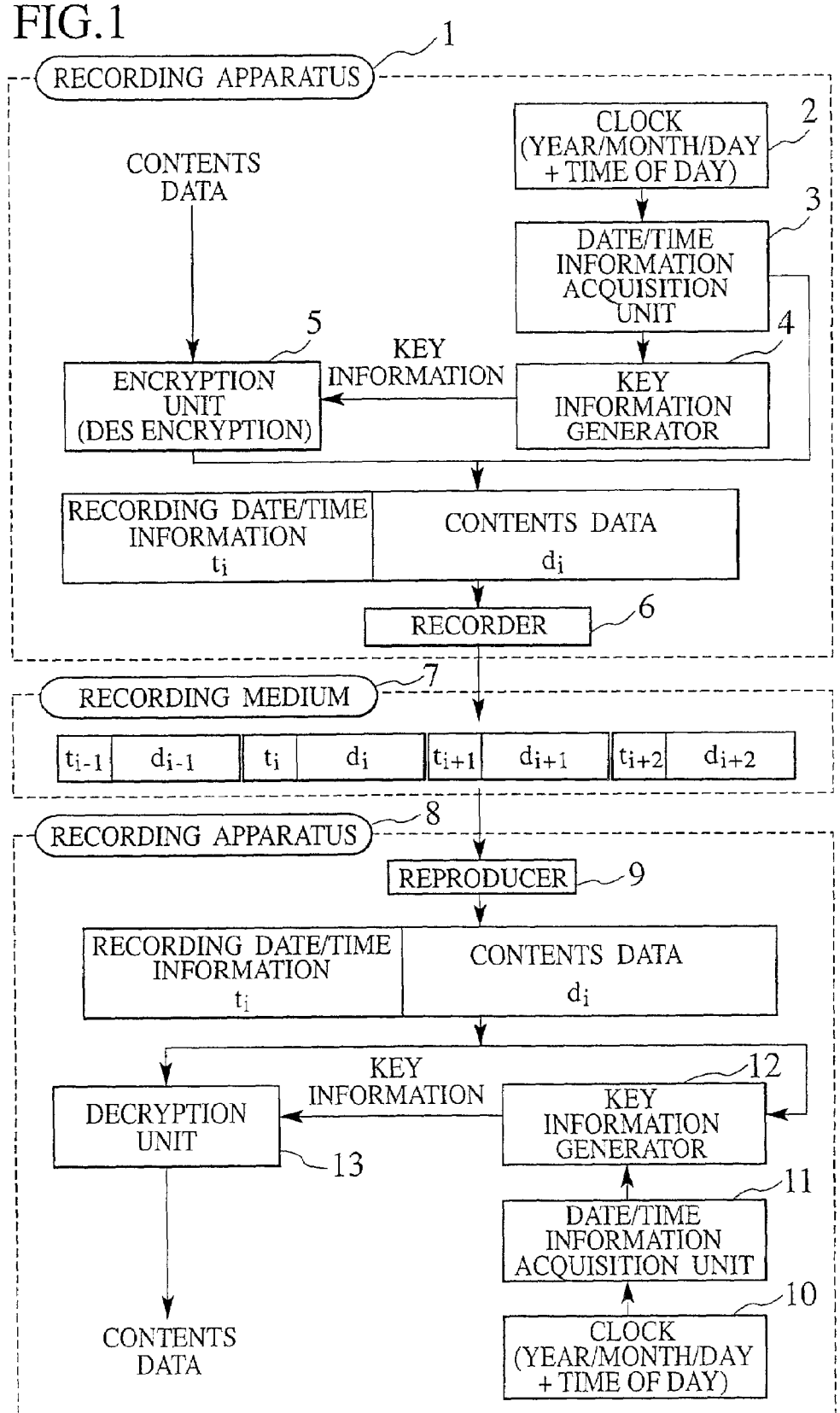
FIG. 1 is a block diagram showing the configuration of a first embodiment.

A first embodiment of a recording apparatus and a reproducing apparatus according to the present invention will be described below with reference to FIG. 1. A recording apparatus 1 comprises a clock 2 in which a year/month/day (date) and a time of day can be set, a date/time information acquisition unit 3 that acquires information on a necessary date/time (date and time of day) from the clock 2, a key information generator 4 that uses contents reproduction permission information and date/time information to generate an encryption key (key information) to be used for encrypting contents, an encryption unit 5 that encrypts contents using an encryption key (key information) generated by the key information generator 4, and a recorder 6 that records encrypted contents and recording date/time information onto a recording medium 7. The recording date/time information refers either to information on a date/time that is between the moment the contents are input to the apparatus and the moment the contents are recorded or to preset recording date/time information.

In the clock 2, information on a date/time such as a year, a month, a day, hours, minutes, and seconds may be set. The date/time information acquisition unit 3 processes information on a year, a month, a day, hours, minutes, and seconds, which is acquired from the clock 2, as the BCD (Binary Coded Decimal) code. Note that eight bits are used for year information 00–99 represented as the Christian Era, five bits for month information 1–12, six bits for day information 1–31, six bits for hour information 0–23, seven bits for minute information 0–59, and seven bits for second information 0–59.

The key information generator 4 first finds 1-bit contents reproduction permission information, x, that satisfies the expression below.

$$x=f(CT-RT) \quad \text{(Expression 1)}$$

where, the function $f(y)=0$ if $y<T$ or $y=T(T>0)$, and $f(y)=1$ if $y>T$. CT and RT are the current date/time and the recording date/time, respectively. T is reproduction permission limit information that will be described later.

Next, based on the obtained x and the recording date/time information, the key information generator 4 generates an encryption key from the expression below and outputs the generated encryption key.

x||(year information)||(year information)||(year information)||(month information)||(day information)||(hour information)||(minute information)||(second information)=(1 bit)||(8 bits)||(8 bits)||(8 bits)||(5 bits)||(6 bits)||(6 bits)||(7 bits)||(7 bits)=(56 bits)=(encryption key)

In most cases, the current date/time matches the recording date/time (same date and same time of day). Therefore, $x=f(CT-RT)=f(0)=0$ is used in the key information as contents reproduction permission information indicating that reproduction is permitted. (Note that the || symbol represents the following concatenation. Assume that an 8-bit bit string is, for example, b7b6b5b4b3b2b1b0. Then, b7b6b5b4||b3b2b1b0=b7b6b5b4b3b2b1b0 for the 4-bit bit string b7b6b5b4 and the 4-bit bit string b3b2b1b0)

The encryption unit 5 uses this encryption key to encrypt the contents according to the DES (Data Encryption Standard) algorithm. The encrypted contents data di, as well as the recording date/time information ti, is recorded on the recording medium 7 by the recorder 6.

At this time, the contents data di is video or audio information that is recorded for a particular time Lt. After the particular time Lt has elapsed, the date/time information acquisition unit 3 acquires date/time information (recording date/time information) from the clock, and the key information generator 4 generates a new encryption key. The contents encrypted by the encryption unit 5 using the new encryption key, which is contents data di+1, and the recording date/time information ti+1 (=ti+Lt) are recorded by the recorder 6 on the recording medium.

The recording medium may be any medium, including an optical disc, magnetic tape, fixed memory, and hard disk, on which digital data may be recorded.

Although the time of day t is recorded at an interval of a particular time Lt in the above description, only the date/time information corresponding to the start of contents recording may be recorded. In this case, for the recording date/time information on intermediate contents, a value converted from the time code information or the system clock information described in the contents is used. For example, for MPEG (Moving Picture Experts Group) data, the GOP (Group of Pictures) layer of video contains a time code. Also, the system layer contains SCR (System Clock Reference) or PCR (Program Clock Reference) which is count information generated at 90K Hz or 27M Hz clock precision. With the use of this information, the date/time information may be generated by adding the elapsed time to the date/time information at the time the leading part of the contents is recorded.

Next, a reproducing apparatus 8 comprises a reproducer 9 that reads encrypted contents and its recording date/time information from the recording medium 7, a decryption unit 13 that decrypts the encrypted contents, a clock 10 in which a year/month/day (date) and a time of day may be set, a date/time information acquisition unit 11 that acquires date/time information (date and time of day) from the clock 10, and a key information generator 12 that uses reproduction date/time information acquired by the date/time information acquisition unit 11, recording date/time information read by the reproducer 9, and reproduction permission limit information to generate a decryption key (key information) to be used for decryption. The reproduction date/time information is information on a date/time that is between the moment a reproduction request for encrypted contents is made and the moment a decryption key (key information) used to decrypt the encrypted contents is generated.

The reproducing apparatus 8 first causes the reproducer 9 to read encrypted contents and information on the recording date/time at which the contents was recorded on the recording medium (or preset recording date/time information) from the recording medium 7. Then, as in the recording apparatus 1, the date/time information acquisition unit 11 acquires the current date/time (reproduction date/time) from the clock 10 for use in generating a decryption key (key information).

The key information generator 12 uses the current date/time (reproduction date/time) CT acquired by the date/time information acquisition unit 11 and the recording date/time RT read from the recording medium to calculate contents reproduction permission information, x, from expression (1) described above. A 56-bit decryption key is generated, as in the recording apparatus 1, using the calculated x and the recording date/time information, that is, year, month, day, time, hours, minutes, and seconds. The decryption unit 13 uses the generated decryption key to decrypt the contents according to the DES encryption algorithm.

At this time, if (CT−RT) is equal to or smaller than the value of the predetermined reproduction permission limit information, T, in the reproducing apparatus, the value of the contents reproduction permission information, x, becomes 0 (that is, x=0), meaning that the generated key is identical to the key generated at recording time. Therefore, the contents are reproduced correctly. On the other hand, if (CT−RT) is larger than the value of the predetermined reproduction permission limit information, T, the value of the contents reproduction permission information, x, becomes 1 (x=1), meaning that the key is different from that generated at recording time. Therefore, the contents are not reproduced correctly.

As described above, the recording apparatus and the reproducing apparatus in this embodiment shown in FIG. 1 allow the user to play back the contents only when the period between the recording date/time and the reproduction date/time is smaller than or equal to the value of the reproduction permission limit, T. More specifically, with the recording apparatus and the reproducing apparatus in the embodiment show in FIG. 1, the user can play back the contents only if the period of time between the time indicated either by the information on the recording date/time at which encrypted contents were recorded on the recording medium or by the preset recording date/time information and the time indicated by the reproduction date/time information, which is the information on a date/time that is between the moment a reproduction request for the encrypted and recorded contents is made and the moment key information used to decrypt the encrypted contents is generated, is smaller than or equal to the value of the reproduction permission limit information, T.

The reproduction permission limit information, T, may be set in the reproducing apparatus in advance or may be set as necessary based on externally supplied information (for example, information recorded on the recording medium) according to the contents.

If the recorder 6 in FIG. 1 replaced by a transmitter that transmits both encrypted contents and transmission date/time information on the date/time at which the encrypted contents were transmitted or preset transmission date/time information (transmission date/time information is used instead of recording date/time information in other components), the recording apparatus 1 may be applied to a transmitter. In this case, the recording medium 7 is a transmission medium by which both the encrypted contents and the transmission date/time information on the date/time at which the encrypted contents were transmitted or the preset transmission date/time information are transmitted.

The reproducing apparatus 8 shown in FIG. 1, if used as described below, may also be applied to a reception apparatus. The reproducer 9 is used as a reception/storage unit that receives encrypted contents and transmission date/time information on the date/time at which the encrypted contents were transmitted or predetermined transmission date/time information and stores therein the received encrypted contents and the transmission date/time information. The date/time information acquisition unit 11 acquires reproduction date/time information on a date/time that is between the moment a reproduction request for the stored encrypted contents is made and the moment key information used to decrypt the encrypted contents is generated. The key information generator 12 generates contents reproduction permission information indicating the permission of the encrypted contents, based on the stored transmission date/time information, the reproduction date/time information acquired by the date/time information acquisition unit 11, and the reproduction permission limit information T of the encrypted contents. Then, the key information generator 12 generates a decryption key from the contents reproduction permission information.

The reproduction permission limit information, T, may be set in the reception apparatus in advance or may be set as necessary based on externally supplied information (for example, transmitted information) according to the contents. The information from which the reproduction permission limit information T is generated may be described, for example, as follows. When an MPEG2 system (TS stream) is used as in digital broadcasting, a descryptor for time limit information may be defined and described in the PMT (Program Map Table). It may also be described in a header that is attached to the contents. The reception apparatus detects the data and sets it as the reproduction permission limit information T.

<Second Embodiment>

Next, a second embodiment of a recording apparatus and a reproducing apparatus according to the present invention will be described below with reference to FIG. 2. A recording apparatus 21 comprises a clock 22 in which a year/month/day (date) and a time of day can be set, a date/time information acquisition unit 23 that acquires information on a necessary date/time (date and time of day) from the clock 22, a key information generator 24 that generates an encryption key (key information) to be used for encrypting contents, a memory manager 27 that manages key generating information and recording date/time information, a flash memory 28 in which the key generating information and the recording date/time information are associated and stored, an encryption unit 25 that encrypts contents using an encryption key generated by the key information generator 24, and a recorder 26 that records encrypted contents and recording date/time information onto a recording medium 31. The recording date/time information refers to information on a date/time that is between the moment contents are input to the apparatus and the moment the contents are recorded.

In the clock 22, information on a date/time such as a year, a month, a day, hours, minutes, and seconds may be set. The date/time information acquisition unit 23 processes information on a year, a month, a day, hours, minutes, and seconds, which is acquired from the clock 22, as the BCD (Binary Coded Decimal) code. Note that eight bits are used for year information 00–99 represented as the Christian Era, five bits for month information 1–12, six bits for day information 1–31, six bits for hour information 0–23, seven bits for minute information 0–59, and seven bits for second information 0–59.

The key information generator 24 generates a random number ri as key generating information and generates an encryption key based on the random number ri.

The random number ri, as well as information a date/time at which the random number ri is generated (corresponding to recording date/time information), is output to the memory manager 27. The memory manager 27 stores the random number ri and the date/time information ti in the flash memory 28 for management. The flash memory 28 used in this embodiment is removable.

The generated encryption key is output to the encryption unit 25. The encryption unit 25 uses this encryption key to encrypt the contents according to the DES encryption algorithm. With the date/time information ti, which is obtained by the date/time information acquisition unit 23 and used to generate the random number ri, as the recording date/time information, the recorder 26 records the recording date/time information ti and the encrypted contents data di to the recording medium 31.

At this time, the contents data di is video or audio information that is recorded for a particular time Lt. After the particular time Lt has elapsed, the date/time information acquisition unit 23 acquires date/time information (recording date/time information) from the clock 22, and the key information generator 24 generates anew encryption key. The contents encrypted by the encryption unit 25 using the new encryption key, which is contents data di+1, and the recording time of day ti+1 (=ti+Lt) are recorded by the recorder 26 on the recording medium.

The memory manager 27 erases a random number ri whose associated date/time information (recording date/time information) ti in the flash memory 28 has elapsed a predetermined period of time or changes such a random number and its date/time information to a new random number rk and its associated date/time information tk. The memory manager 27 has comparing means that compares the date/time information (recording date/time information) ti and the current date/time information that is the information on the current date/time acquired by the date/time information acquisition means. This comparing means checks if a predetermined period of time has elapsed from the date/time information (recording date/time information) ti.

The recording medium 31 on which the contents and the recording date/time information are recorded by the recorder 26 maybe any medium, including an optical disc, magnetic tape, fixed memory, and hard disk.

Next, a reproducing apparatus 41 comprises a reproducer 42 that reads encrypted contents and its recording date/time information from the recording medium 31, a decryption unit 48 that decrypts the encrypted contents, a clock 43 in which a year/month/day (date) and a time of day may be set, a date/time information acquisition unit 44 that acquires date/time information (date and time of day) from the clock 43, a memory manager 45 that manages a random number ri and its date/time information (corresponding to recording date/time information) ti in a flash memory 46 based on the current date/time information acquired by the date/time information acquisition unit 44 and the recording date/time information read by the reproducer 42, the flash memory 46 in which a random number ri and its date/time information ti are stored, and a key information generator 47 that generates a decryption key with a random number ri in the flash memory as key generating information. The flash memory 46 is the flash memory 28 removed from the recording apparatus 21 after the recording operation on the recording medium 31 ends and then mounted on the reproducing apparatus 41 (If the recording/reproducing apparatus contains both the recording apparatus 21 and the reproducing apparatus 41, the flash memory need not be removal but fixed because the flash memory is sharable).

The reproducing apparatus 41 first causes the reproducer 42 to read encrypted contents and information on the recording date/time at which the contents was recorded on the recording medium (in this example, date/time information ti on the date on which the random number ri was generated). Based on the recording date/time information that has been read, the memory manager 45 outputs the random number, which corresponds to the date/time information, to a key information generator 47 as the key generating information. The key information generator 47 generates a decryption key and outputs it to the decryption unit 48. The decryption unit 48 decrypts the encrypted contents.

If, in the recording apparatus 21, a predetermined time has elapsed with the flash memory 28 mounted and therefore the corresponding random number in the flash memory 28 of the recording apparatus 21 has been erased or changed, the corresponding random number in the flash memory 46 mounted on the reproducing apparatus 41 is also erased or changed accordingly. Therefore, because valid key generating information is not found, a decryption key is not generated and the contents are not reproduced correctly.

Also, the date/time information acquisition unit 44 of the reproducing apparatus 41 acquires the current date/time information. The memory manager 45 checks the date/time information (recording date/time information) ti associated with a random number ri in the flash memory 46 and either erases a random number ri that has elapsed a predetermined time or changes a random number and its date/time information to a new random number rk and its time of day information tk. The memory manager 45 has comparing means that compares the date/time information (recording date/time information) ti and the current date/time information that is the information on the current date/time acquired by the date/time information acquisition unit 44. This comparing means checks if a predetermined period of time has elapsed from the date/time information (recording date/time information) ti.

Again, in this case, if a predetermined period of time has elapsed, correct key generating information is not in the flash memory 46. A decryption key is not generated and therefore the contents cannot be decrypted.

Figure 2:
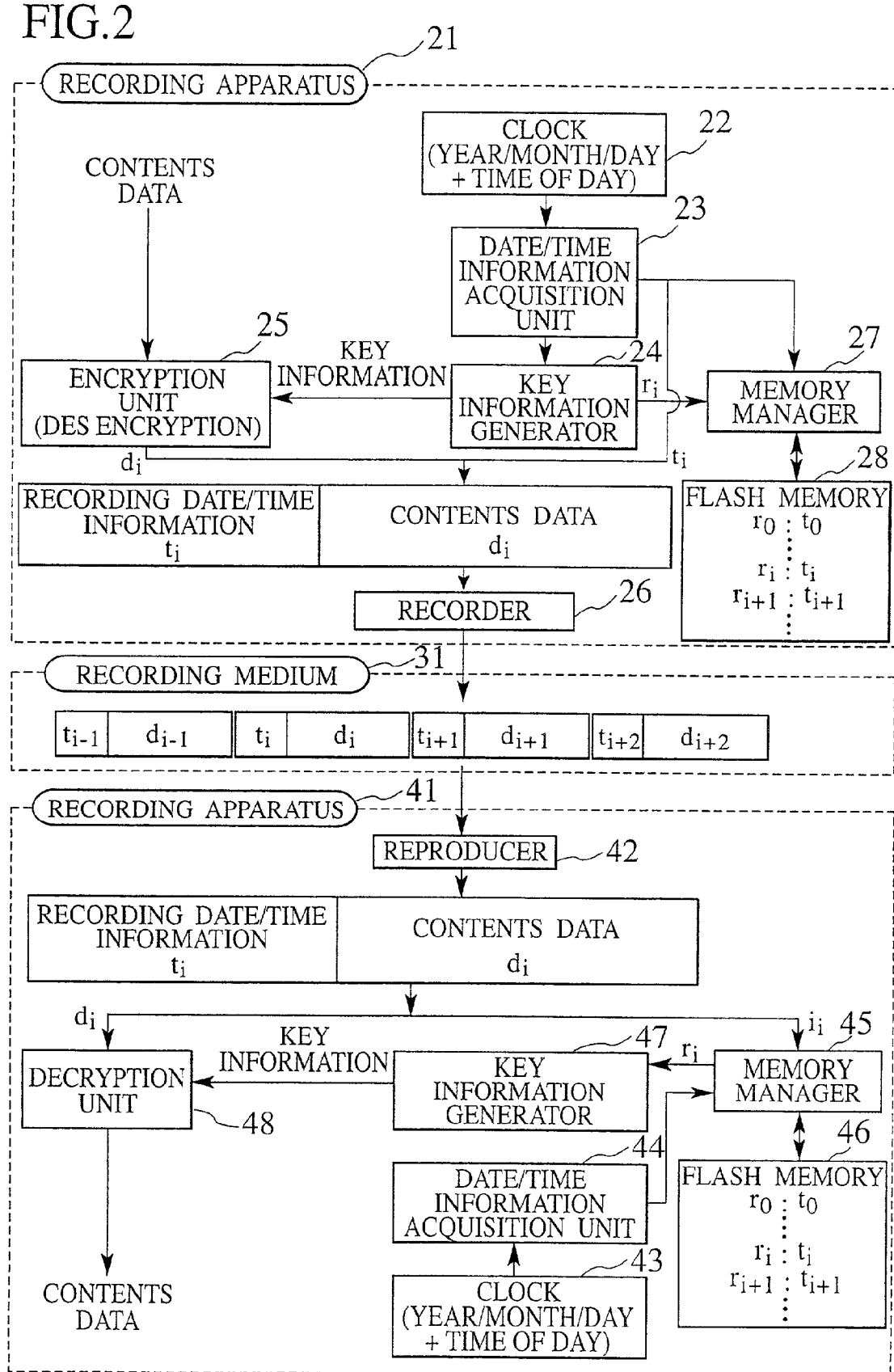
FIG. 2 is a block diagram showing the configuration of a second embodiment.

As described above, the recording apparatus and the reproducing apparatus in the second embodiment shown in FIG. 2 allow the user to play back the contents recorded on a recording medium for a particular period of time simply by erasing or changing key generating information.

<Third Embodiment>

Figure 3:
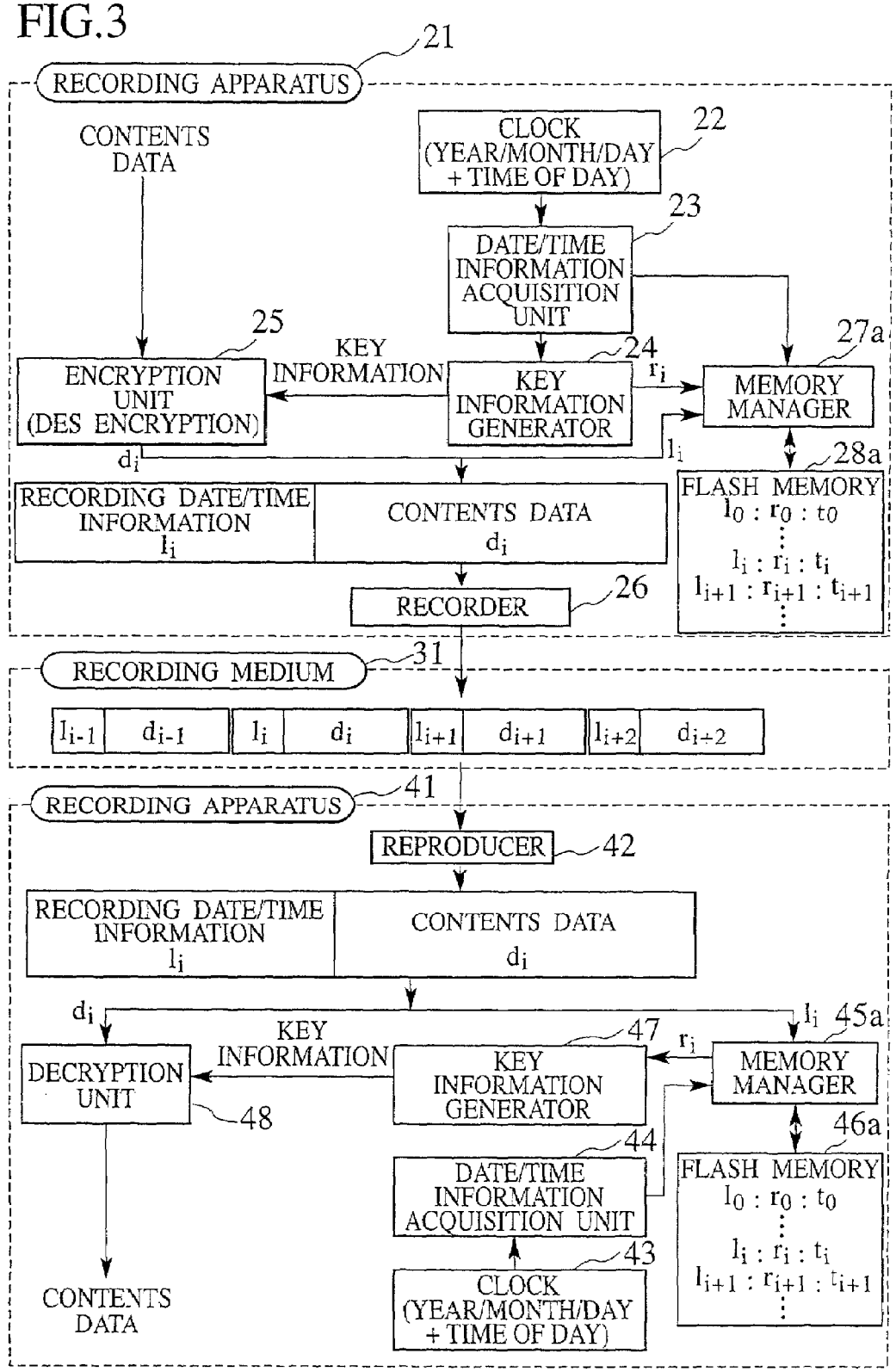
FIG. 3 is a block diagram showing the configuration of a third embodiment.

Next, a third embodiment of a recording apparatus and a reproducing apparatus according to the present invention will be described below with reference to FIG. 3.

In the second embodiment, the recording date/time information ti is used to associate key generating information (random number ri) in the flash memory with recorded contents data encrypted by the key generated based on that information. In the third embodiment, link information li is used to associate key generating information (random number ri) in the flash memory with recorded contents data encrypted by the key generated based on that information, as shown in FIG. 3. That is, the link information li is recorded on a recording medium 31a for each piece of encrypted contents data di. The flash memory also stores the link information li associated with a random number ri and date/time information (recording date/time information) ti by a memory manager 27a. The reproducing apparatus reads the link information li from the recording medium 31a and, based on the link information, causes a memory manager 45a to read the random number ri linked to the encrypted contents data from a flash memory 46a. This configuration makes it possible to execute the operation similar to that in the second embodiment.

The link information uses a much smaller number of bits than that of recording date/time information. Therefore, the third embodiment ensures recording efficiency higher than that in the second embodiment.

Although date/time information, that is, year, month, day, hours, minutes, and seconds, is described as information obtained from the clock in the above embodiments, any date/time information that identifies a particular point in time may be used.

Instead of recording on a recording medium, data created by the present invention may be applied also to a transmission method or an apparatus that uses broadcasting or communication. Similarly, instead of reproducing from a recording medium, data created by the present invention may be applied to a reception method or a reception apparatus that receives data from broadcasting or communication infrastructures. Data created by the present invention may also be applied to electronic data with this function that is recorded on a hard disk server and to a transmission medium over which electronic data is transmitted. The encryption method is not limited to the DES encryption but other common key cryptosystems or public key cryptosystems may be used. Key generating information used to generate a key may be a parameter other than time-of-day information and a random number. In addition, not only time-of-day information but also other information indicating a specific correspondence may be used to establish the correspondence between the key generating information in the flash memory in FIG. 2 and contents data.

The present invention implements a recording apparatus, a reproducing apparatus, a transmission apparatus, or a reception apparatus that prevents data from being decrypted when a predetermined time elapses. However, it is possible to set the date/time in the clock to a time before the current time to alter the setting so that data may be decrypted.

To avoid such a condition, it is preferable to prepare in advance a parameter which changes at least part of decryption key generating information. This is done to protect against a case in which the clock is changed due to an external cause, a case in which recording date/time information recorded with contents data is illegally modified, or a case in which a decryption-related part of the key information generator, encryption unit, or decryption unit in the apparatus is illegally decoded or altered.

For example, the key generating information should be a random number generated when the power is turned on or when recording is started and, in addition, the random number should be recorded in a predetermined volatile memory. The random number should be erased or should be changed to a new random number when the power is turned off, when the clock is illegally changed by an external cause, when a predetermined time has elapsed, or when the recording date/time information recorded with the contents data is changed or accessed. This precaution prevents the correct decryption key from being obtained and the contents from being decrypted when the clock is illegally changed, when data on the recording medium is altered, or when the apparatus is remodeled or analyzed.

<Fourth Embodiment>

Figure 4:
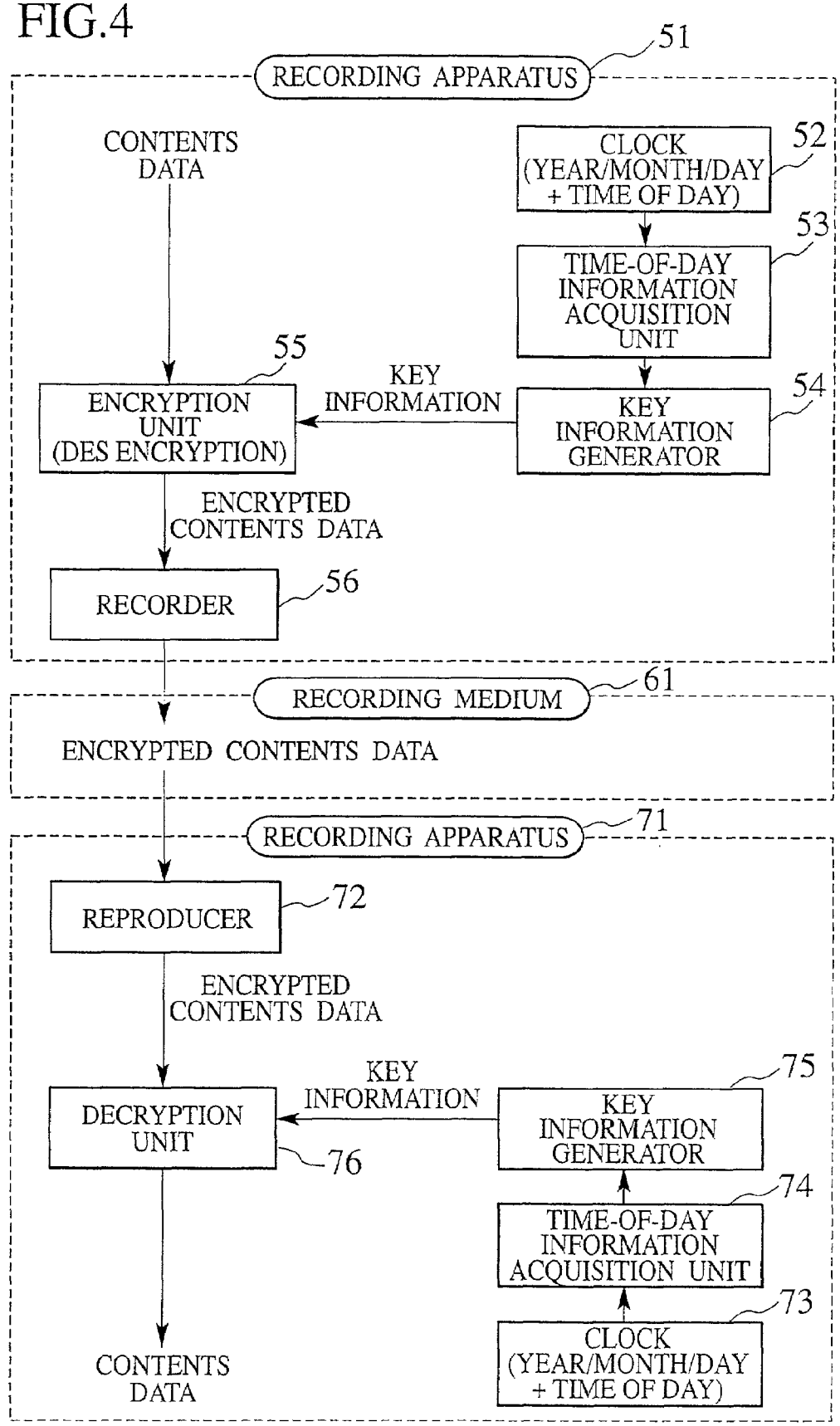
FIG. 4 is a block diagram showing the configuration of a fourth embodiment.

Next, a fourth embodiment of a recording apparatus and a reproducing apparatus according to the present invention will be described below with reference to FIG. 4. In the fourth embodiment, the recording apparatus and the reproducing apparatus allow the user to decrypt encrypted recorded contents for a predetermined period of time.

A recording apparatus 51 comprises a clock 52 in which a year/month/day and time of day information can be set, a time-of-day information acquisition unit 53 that acquires information on a necessary date/time from the clock 52, a key information generator 54 that generates an encryption key, which will be used for encrypting contents, from time-of-day information, and an encryption unit 55 that encrypts contents using an encryption key generated by the key information generator.

In the clock 52, information on a date/time such as a year, a month, a day, hours, minutes, and seconds may be set. The time-of-day information acquisition unit 53 processes information on a year, a month, and a day, which is part of information acquired from the clock 52, as the BCD (Binary Coded Decimal) code. Note that eight bits are used for year information 00–99 represented as the Christian Era, five bits for month information 1–12, and six bits for day information 1–31. The common key cryptosystem that uses the DES encryption, if used in the encryption unit 55, requires 64 bits for an encryption key. Note that eight bits are used as parity bits. The key information generator 54 generates an encryption key from the expression below and outputs the generated encryption key.

(year information)||(month information)||(month information)||(month information)||(month information)||(month information)||(month information)||(day information)||(day information)||(day information)=(8 bits)||(5 bits)||(5 bits)||(5 bits)||(5 bits)||(5 bits)||(5 bits||(6 bits)||(6 bits)||(6 bits)=(56 bits)=(encryption key)

The encryption unit 55 uses this encryption key to encrypt the contents according to the DES encryption algorithm. The encrypted contents are recorded by the recorder 56 on a recording medium 61. The recording medium 61 may be any medium, including an optical disc, magnetic tape, fixed memory, and hard disk, on which digital data may be recorded.

A reproducing apparatus 71 comprises a reproducer 72 that reads encrypted contents from the recording medium, a decryption unit 76 that decrypts the encrypted contents, a key information generator 75 that generates a decryption key used for decryption, a time-of-day information acquisition unit 74 that acquires time-of-day information from a clock 73 for use as key generating information, and the clock 73 in which a year/month/day and a time of day information may be set.

The reproducing apparatus 71 first causes the reproducer 72 to read contents from the recording medium. As with the recording apparatus 51, the reproducing apparatus 71 uses the clock 73, time-of-day information acquisition unit 74, and key information generator 75 to obtain a 56-bit key for contents decryption. With the obtained key, the decryption unit 76 decrypts the contents according to the DES encryption algorithm. If at least one of the year, month, and day is different from that of the recording time, the decryption key obtained from the key information generator 75 is different from the encryption key and therefore the contents cannot be reproduced correctly. As described above, the recording apparatus and the reproducing apparatus shown in FIG. 4 allow the user to play back the contents on a particular day/month/year.

<Fifth Embodiment>

Next, a fifth embodiment of a recording apparatus and a reproducing apparatus according to the present invention will be described below with reference to FIG. 5. In the fifth embodiment, the recording apparatus and the reproducing apparatus allow the user to decrypt encrypted recorded contents for a predetermined period of time.

A recording apparatus 81 comprises a clock 82 in which a year/month/day and time of day information may be set, a time-of-day information acquisition unit 83 that acquires information on a necessary date/time from the clock 82, a key information generator 84 that generates an encryption key which will be used for encrypting contents, an encryption unit 85 that encrypts contents using an encryption key generated by the key information generator 84, and a recorder 86 that records encrypted contents and recording time-of-day information on a recording medium.

In the clock 82, information on a date/time such as a year, a month, a day, hours, minutes, and seconds may be set. The time-of-day information acquisition unit 83 processes information on a year, a month, a day, hours, minutes, and seconds, obtained from the clock, as the BCD (Binary Coded Decimal) code. Note that eight bits are used for year information 00–99 represented as the Christian Era, five bits for month information 1–12, six bits for day information 1–31, six bits for hour information 0–23, seven bits for minute information 0–59, and seven bits for second information 0–59. The key information generator 84 generates a 56-bit key similar to that used in the reproducing apparatus.

The encryption unit 85 uses this encryption key to encrypt the contents according to the DES encryption algorithm. The encrypted contents data di and the time-of-day information ti, which is recording time-of-day information obtained by the time-of-day information acquisition unit 83, are recorded by the recorder 86 onto a recording medium 91. At this time, the contents data di is video or audio information that is recorded for a particular time Lt. After Lt has elapsed, the time-of-day information acquisition unit 83 acquires date/ time information from the clock 82. The contents encrypted by the encryption unit 85, which is contents data $d_{i+1}$, and the recording time of day $t_{i+1}$ ($=t_i+L_t$) are recorded by the recorder 86 on the recording medium. The recording medium 91 maybe any medium, including an optical disc, magnetic tape, fixed memory, and hard disk.

A reproducing apparatus 101 comprises a reproducer 102 that reads encrypted contents and its recording time-of-day from the recording medium, a decryption unit 108 that decrypts the encrypted contents, a clock 103 in which year/month/day and time-of-day information may be set, a time-of-day information acquisition unit 104 that acquires time-of-day information from the clock 103, a time-of-day information comparison unit 105 that compares acquired time-of-day information with recording time-of-day information read by the reproducer 102, a decryption controller 106 that stops contents decryption in the decryption unit 108 according to the result of the time-of-day information comparison unit 105, and a key information generator 107 that generates a decryption key used for decryption.

The reproducing apparatus 101 first causes the reproducer 102 to read contents and the contents recording time-of-day information from the recording medium 91. The time-of-day information comparison unit 105 compares the recording time-of-day information that was read with the current time-of-day information obtained from the clock 103 by the time-of-day information acquisition unit 104. The time-of-day information comparison unit 105 finds the difference between the current time-of-day and the recording time-of-day. If the difference between the current time-of-day and the recording time-of-day obtained by the time-of-day information comparison unit 105 is equal to or larger than a particular value T, the decryption controller 106 causes the decryption unit 108 to stop contents decryption.

Figure 5:
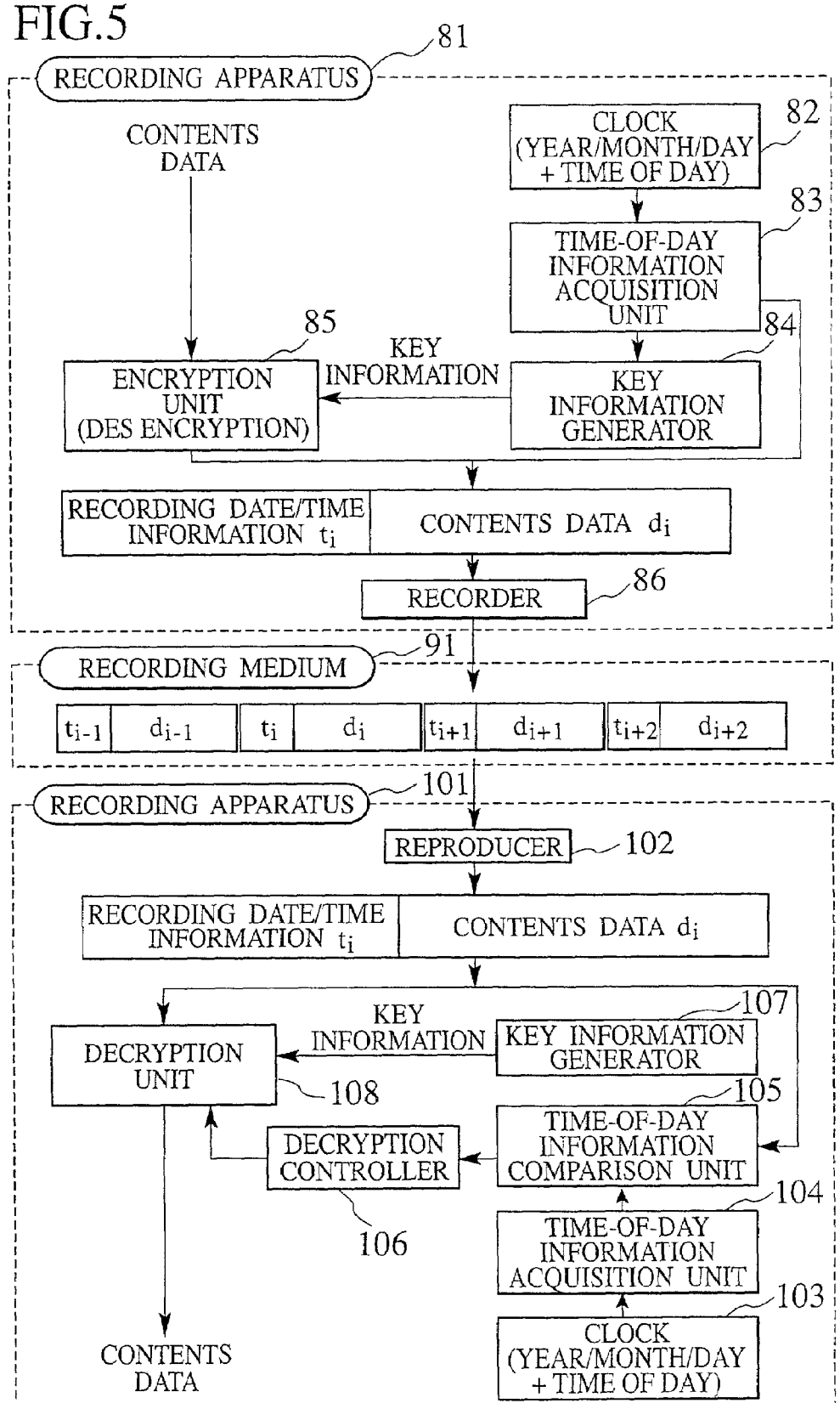
FIG. 5 is a block diagram showing the configuration of a fifth embodiment.

As described above, with a particular value T preset in the controller of the reproducing apparatus, the recording apparatus and the reproducing apparatus shown in FIG. 5 allow the user to play back the contents recorded on the recording medium only for a predetermined period of time.

As described above, the contents recording apparatus, recording medium, contents reproducing apparatus, contents transmission method, transmission medium, and contents reception method according to the present invention allow the user to decrypt encrypted recorded contents for a predetermined period of time. Providing a contents user with the ability to decrypt encrypted contents, which are once recorded on the user's side, only for a predetermined period of time (a period of time allowed by a contents right holder) enables the contents user to use the contents any time during the period of time (any time within the period of time allowed by the contents right holder) and, at the same time, protects the copyright of the recorded contents. Thus, this ability gives a great advantage both to the user and the contents right holder.

It should be understood that many modifications and adaptations of the invention will become apparent to those skilled in the art and it is intended to encompass such obvious modifications and changes in the scope of the claims appended hereto.

What is claimed is:

1. A contents recording apparatus comprising:
   date/time information acquiring means for acquiring information on a date and time;
   contents reproduction permission information generating means for generating contents reproduction permission information indicating that contents may be reproduced;
   key information generating means for generating key information based at least on the generated contents reproduction permission information;
   encrypting means for encrypting the contents based on the generated key information; and
   recording means for recording the encrypted contents and recording date/time information or preset recording date/time information in a recording medium, said recording date/time information being acquired by said date/time information acquiring means and being information on a date/time that is between a moment the contents are entered and a moment the contents are recorded.

2. A recording medium recording therein:
   contents encrypted based on key information generated based at least on contents reproduction permission information indicating that the contents may be reproduced; and
   either recording date/time information on a date/time at which recording operation on the encrypted contents was performed or preset recording date/time information.

3. A contents reproducing apparatus that reproduces contents from a recording medium storing therein contents encrypted based on key information, generated based at least on contents reproduction permission information indicating that the contents may be reproduced, and either recording date/time information on a date/time at which recording operation on the encrypted contents was performed or preset recording date/time information, said contents reproducing apparatus comprising:
   date/time information acquiring means for acquiring information on a date and time;
   contents reading means for reading the encrypted contents from said recording medium;
   recording date/time information reading means for reading the recording date/time information from said recording medium;
   contents reproduction permission information generating means for generating contents reproduction permission information indicating that the encrypted contents may be reproduced based on the recording date/time information that was read, reproduction date/time information that is acquired by said date/time information acquiring means and that is information on a date/time that is between a moment a reproduction request for the encrypted contents is made and a moment key information for decrypting the encrypted contents is generated, and reproduction permission limit information on the encrypted contents;
   key information generating means for generating the key information based at least on the generated contents reproduction permission information; and
   decrypting means for decrypting the encrypted contents read from said recording medium based on the key information generated by said key information generating means.

4. The contents reproducing apparatus according to claim 3, wherein the reproduction permission limit information is set in the apparatus in advance.

5. The contents reproducing apparatus according to claim 3, wherein the reproduction permission limit information is set in the apparatus based on eternally supplied information.

6. A contents recording apparatus comprising:
   date/time information acquiring means for acquiring information on a date/time;

key information generating means for generating key-information generating information and for generating key information from the key-information generating information;
encrypting means for encrypting contents based on the generated key information;
recording means for recording, in a recording medium, the encrypted contents and recording date/time information that is acquired by said date/time information acquiring means and that is information on a date/time that is between a moment the contents are entered and a moment the contents are recorded; and
retaining means for retaining the recording date/time information acquired by said date/time information acquiring means and the key-information generating information generated by said key information generating means, the recording date/time information being associated with the key-information generating information.

7. The contents recording apparatus according to claim 6, further comprising:
comparing means for comparing the recording date/time information retained in said retaining means and current date/time information that is information on a current date/time acquired by said date/time information acquiring means; and
controlling means for erasing or changing the recording date/time information retained in said retaining means and the key-information generating information associated with the recording date/time information according to a comparison result of said comparing means.

8. A contents reproducing apparatus that reproduces encrypted contents from a recording medium storing therein the contents encrypted based on key information and recording date/time information on a date/time at which recording operation on the encrypted contents was performed, said reproducing apparatus comprising:
contents reading means for reading the encrypted contents from said recording medium;
recording date/time information reading means for reading the recording date/time information from said recording medium;
retaining means for retaining the recording date/time information and key-information generating information, the recording date/time information being associated with the key-information generating information;
retained information reading means for reading the key-information generating information, which is associated with the recording date/time information that was read, from said retaining means;
key information generating means for generating the key information based on the key-information generating information that was read; and
decrypting means for decrypting the encrypted contents, read from said recording means, based on the key information generated by said key information generating means.

9. The contents reproducing apparatus according to claim 8, further comprising:
date/time information acquiring means for acquiring information on a date/time;
comparing means for comparing the recording date/time information retained in said retaining means and current date/time information that is information on a current date/time acquired by said date/time information acquiring means; and
a controller that stops an information reading operation of said retained information reading means or stops a decryption operation of said decrypting means according to a comparison result of said comparing means.

10. A contents transmission method comprising the steps of:
generating contents reproduction permission information indicating that contents may be reproduced;
generating key information based at least on the generated contents reproduction permission information;
encrypting the contents based on the generated key information; and
transmitting the encrypted contents and either transmission date/time information on information on a date/time at which a transmission operation of the encrypted contents was performed or preset transmission date/time information.

11. A transmission medium that transmits:
contents encrypted based on key information generated based at least on contents reproduction permission information indicating that the contents may be reproduced; and
either transmission date/time information on a date/time at which a transmission operation of the encrypted contents was performed or preset transmission date/time information.

12. A contents reception method that receives contents encrypted based on key information, generated based at least on contents reproduction permission information indicating that the contents may be reproduced, and either transmission date/time information on a date/time at which transmission operation on the encrypted contents was performed or preset transmission date/time information, said method comprising the steps of:
storing the received encrypted contents and the transmission date/time information;
acquiring reproduction date/time information on a date/time that is between a moment a reproduction request for the stored encrypted contents is made and a moment key information for decrypting the encrypted contents is generated;
generating contents reproduction permission information indicating that the encrypted contents may be reproduced based on the stored transmission date/time information, the reproduction date/time information, and contents reproduction permission limit information on the encrypted contents;
generating the key information based at least on the generated contents reproduction permission information; and
decrypting the stored encrypted contents based on the generated key information.

13. The contents reception method according to claim 12, wherein the reproduction permission limit information is set in advance.

14. The contents reception method according to claim 12, wherein the reproduction permission limit information is set based on eternally supplied information.

* * * * *